UNITED STATES PATENT OFFICE.

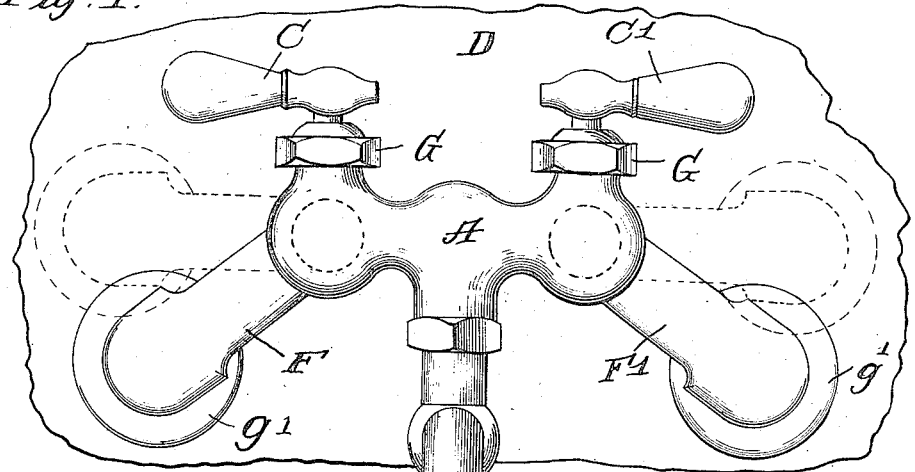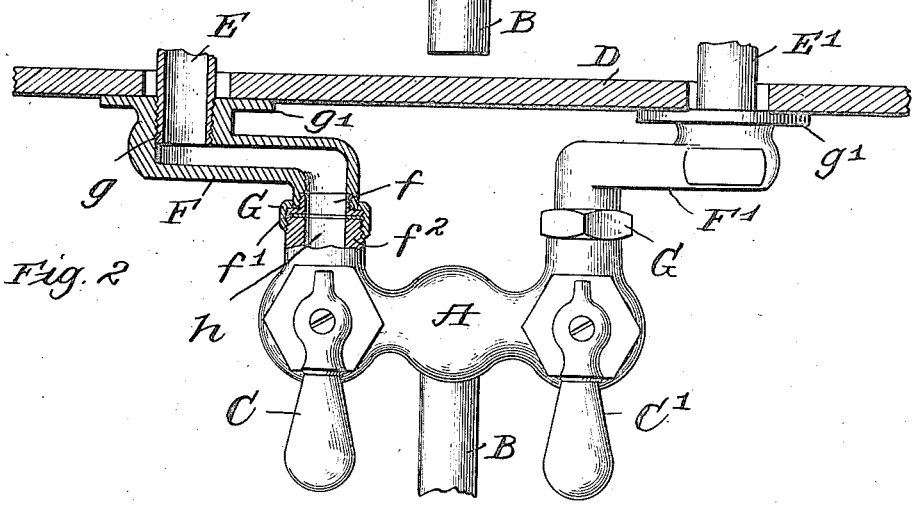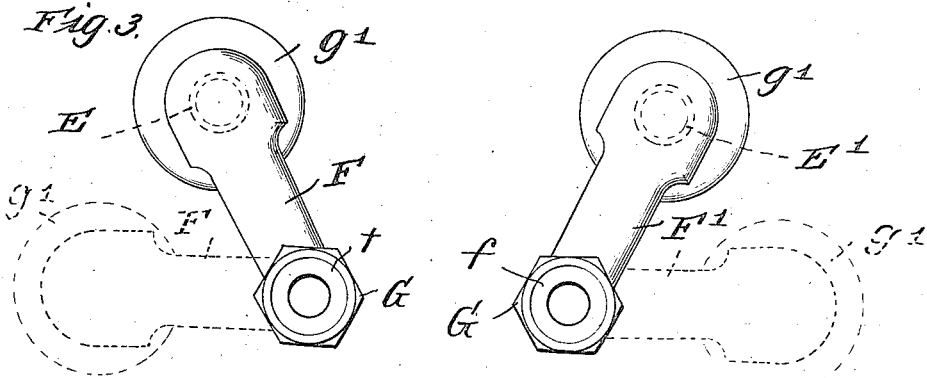

ALBERT C. BROWN, OF CHICAGO, ILLINOIS.

ADJUSTABLE FAUCET ATTACHMENT.

1,181,370.  Specification of Letters Patent.  Patented May 2, 1916.

Application filed December 14, 1914. Serial No. 877,159.

*To all whom it may concern:*

Be it known that I, ALBERT C. BROWN, a citizen of the United States, and residing at Chicago, Cook county, Illinois, have invented certain new and useful Improvements in Adjustable Faucet Attachments, of which the following, taken in connection with the drawing, is a description.

My invention has for its object the production of means for attaching faucets, adapted for use more particularly with the class known as combination mixing faucets, which are well known in the plumbing trade, and extensively used in kitchens, laundries, bath tubs, etc., where water at a certain desired temperature can be obtained from one faucet.

Heretofore in connecting the combination faucet type to the supply pipes, difficulty has been experienced in fitting the same, as a slight variation of but a fraction of an inch makes it necessary to slightly bend the pipes to bring them together, which has not only been inconvenient, but often produced a very unsatisfactory job.

The principal object of my invention is to overcome this objection by providing a connecting link between the faucet and the supply pipes, which easily and quickly takes care of such adjustment as may be necessary to properly fit the pipes together without any twisting or bending of any kind. The preferred method of accomplishing this result is illustrated in the accompanying drawing, in which I have shown what I now consider the simplest and preferred form of my construction, although certain details thereof may be changed without departing from the spirit of my invention, and in these drawings—Figure 1 represents a front elevation of the device, the portion in dotted lines representing a different adjustment; Fig. 2 is a top plan view of the same partly in cross section; and Fig. 3 represents the details of the adjustable link in two different positions.

In carrying out my invention, A represents a combination faucet, preferably although not necessarily, that known as the Quatern type, in which B is the discharge pipe used for both the hot and cold water. This construction is so arranged that one faucet, C, has connection with the cold water supply and the other faucet, C', has connection with the hot water supply, and by turning the handle of either or both, the discharge is made through the pipe B. When water is desired of a certain temperature and both faucets are opened at once, the hot and cold water unite in a chamber formed in the body of the faucet, A, so that the user receives water of whatever temperature is desired.

D represents the wall or stationary support, and E, E', the supply pipes passing through the same, which in their arrangement often vary an inch more or less between centers. As these combination faucets have heretofore been made, the connecting pipes are preferably arranged on eight-inch centers, and this variation of distance between the supply pipes to which they are to be attached causes much inconvenience and waste of valuable time in making the necessary connections.

In my invention I have provided an adjustable link to form this connection by means of which a variety of adjustments can be secured, enabling the faucet to be readily and quickly attached and adjusted to any supply pipe, utilizing in doing so a minimum amount of time and making a very firm and positive attachment.

F, F', are the adjustable links, shown in plan views in Figs. 1 and 3, and in section in Fig. 2. Each of these links is provided upon the end attaching to the faucet, with a nut $f$, which has a screw-threaded engagement therewith, and which is provided with a circumferential shoulder $f'$, the periphery of which is of the same diameter as the faucet port $f^2$, which it abuts, and to which it is secured by a screw-threaded coupling member, G.

The opposite end of this link F, is interiorly screw-threaded as at $g$ to engage the exterior threads upon the supply pipes E, E'. A large circumferentially extending flange $g'$, surrounds the ends of each of these links to provide a proper covering for the opening through which the supply pipe passes and makes connection with the link, so that when the links are screwed to the supply pipes the connection is complete and the opening through the wall is covered.

In assembling the device, the coupling G is placed over the end of the link F, the nut $f$ is screwed in place. The connection is then made by securing the links to the supply pipes. The faucet ports are then fitted to the two links which are easily brought to the proper position to meet the opening L of each faucet, when the coupling member is screwed in place bringing the link and faucet in proper position.

As will be seen by Figs. 1 and 3, the links are capable of being coupled in a large variety of adjustments, varying from 4 to 8½ inches on centers, which provides a great convenience in the matter of precise adjustment, which is ofttimes very difficult in new work and always extremely difficult in repair work.

I claim:

1. In a device of the character described, a combination faucet, horizontal supply pipes extending through a vertical wall, and adjustable links forming a swivel connection between said faucet and the supply pipes, substantially as described.

2. In a faucet, the combination of a casing providing a mixing chamber, a single discharge pipe, valves controlling the openings through the mixing chamber, horizontally-extending supply pipes projecting from a vertical wall, and adjustable pipes forming swivel connections between the supply pipes and the valve-controlled openings to the chamber, substantially as described.

3. A combination faucet, having exteriorly-threaded pipes extending therefrom, horizontally-extending supply pipes projecting through a vertical wall, adjustable pipes forming a swivel connection between the supply pipes and the faucet, and means for connecting said adjustable pipes to the faucet, substantially as described.

In testimony whereof I have signed this specification in the presence of two subscribing witnesses.

ALBERT C. BROWN.

Witnesses:
   E. E. BROWN,
   H. E. AGNESS.